United States Patent
Jagjit et al.

(10) Patent No.: US 12,027,770 B2
(45) Date of Patent: Jul. 2, 2024

(54) SCALABLE REAL-TIME STREAMING CALIBRATION SYSTEM FOR DISTRIBUTED DIGITAL RECEIVER EXCITER (DREX) ANTENNAS

(71) Applicant: Raytheon Company, Waltham, MA (US)

(72) Inventors: Mahendradatt Jagjit, St. Cloud, FL (US); Michael J. Gilbert, Westford, MA (US); Douglas M. Mckay, Nashua, NH (US)

(73) Assignee: RAYTHEON COMPANY, Waltham, MA (US)

( * ) Notice: Subject to any disclaimer, the term of this patent is extended or adjusted under 35 U.S.C. 154(b) by 376 days.

(21) Appl. No.: 17/672,125

(22) Filed: Feb. 15, 2022

(65) Prior Publication Data

US 2023/0261390 A1   Aug. 17, 2023

(51) Int. Cl.
*H01Q 21/00* (2006.01)
*G01S 7/40* (2006.01)

(52) U.S. Cl.
CPC ........... *H01Q 21/0025* (2013.01); *G01S 7/40* (2013.01)

(58) Field of Classification Search
CPC .... H01Q 21/0025; H01Q 21/00; H01Q 3/267; G01S 7/40
See application file for complete search history.

(56) References Cited

U.S. PATENT DOCUMENTS

| | | |
|---|---|---|
| 2016/0156100 A1 | 6/2016 | Sikina et al. |
| 2018/0034564 A1 | 2/2018 | Tankielun et al. |
| 2021/0141056 A1 | 5/2021 | Drapeau et al. |

FOREIGN PATENT DOCUMENTS

CN   113740620 A   12/2021

OTHER PUBLICATIONS

AU 2008344938 A1, Phase array antenna having integral calibration network and method for measuring calibration ratio thereof, pp. 1-9 (Year: 2009).*
International Search Report with Written Opinion issued in International Application No. PCT/US2023/012895; International Filing Date Feb. 13, 2023; Date of Mailing Jun. 6, 2023 (18 pages).
Williamson et al., "Techniques for digital array radar planar near-field calibration by retrofit of an analog system" 2021 IEEE Radar Conference (RadarConf21), IEEE, May 2021 Abstract Only (3 pages).

* cited by examiner

*Primary Examiner* — Keith Ferguson
(74) *Attorney, Agent, or Firm* — CANTOR COLBURN LLP

(57) ABSTRACT

A digital receiver/exciter (DREX) antenna calibration system includes a DREX antenna array, and an antenna probe configured to receive energy from the DREX antenna array and/or transmit energy to the DREX antenna array. A modular signal processing unit is in signal communication with the DREX antenna array. The modular signal processing unit includes a plurality of individual signal processing programmable integrated circuits configured to process the energy. A modular array controller is in signal communication with the probe controller, the DREX antenna array, and the modular signal processing unit. The modular array controller includes at least one modular array unit that includes an array programmable integrated circuit and a multicore processor.

20 Claims, 2 Drawing Sheets

SCALABLE REAL-TIME STREAMING CALIBRATION SYSTEM FOR DISTRIBUTED DIGITAL RECEIVER EXCITER (DREX) ANTENNAS

BACKGROUND

The present disclosure relates generally to large-scale digital antenna arrays, and more particular, to digital receiver exciter antenna systems.

Testing of radar and communication antennas with limited number of digital receiver/exciters (DREXs) can be accomplished by offloading their sampled data to generic computers in a production factory environment. Multi-channel DREX antennas, however, produce large amounts of data and it is beneficial to reduce the data to only useful information as soon as possible instead of transporting to further stages for processing. Transportation, storage, retrieval, and processing of data in instruction set machines are inefficient in terms of latency, power, and deterministic performance. In addition, antenna designs continue to increase the number of implemented channels and data as the technical capabilities move closer to providing element level-digitization and the ability to handle wider bandwidths. The amount of data provided by modern DREX antenna systems continue to grow.

SUMMARY

According to an aspect of the disclosure, a digital receiver/exciter (DREX) antenna calibration system includes a DREX antenna array having a plurality of DREX elements defining a phased array of radiating elements configured to transmit and receive energy, and an antenna probe arranged adjacent to the DREX antenna array and configured to receive energy from the DREX antenna array and/or transmit energy to the DREX antenna array. A modular signal processing unit is in signal communication with the DREX antenna array. The modular signal processing unit includes a plurality of individual signal processing programmable integrated circuits configured to process the data from received energy. A modular array controller is in signal communication with the probe controller, the DREX antenna array, and the modular signal processing unit. The modular array controller includes at least one modular array unit that comprises a programmable integrated circuit and multicore processor.

In accordance with additional or alternative embodiments, each of the signal processing programmable integrated circuits is a signal processing field programmable gate array (FPGA) that is programmed with parallel fast Fourier transform (FFT)-based match filters and one or more synchronous digital circuit models to facilitate scalable data flow corresponding to the DREX antenna array.

In accordance with additional or alternative embodiments, each of the signal processing FPGAs is in signal communication with the DREX antenna array via a data path that includes a plurality of individual data channels.

In accordance with additional or alternative embodiments, the at least one modular array unit is independently programmed with control and processing functionalities based on calibration and measurement target goals provided to the DREX antenna calibration system.

In accordance with additional or alternative embodiments, the antenna probe is configured to move with respect to the DREX antenna array so as to be placed in signal communication with a given DREX element.

In accordance with additional or alternative embodiments, the system further comprises a probe controller in signal communication with the antenna probe. The probe controller is configured to output one or more probe control signals that control a position of the antenna probe with respect to the DREX antenna array.

In accordance with additional or alternative embodiments, the probe controller controls the antenna probe to operate in one or both of a receiving mode to receive energy from a given DREX element and a transmitting mode to transmit energy to a given DREX element among the plurality of DREX elements according to a grid of probe positions. The received energy can be used to generate sampled data, which in turn can be processed by the modular signal processing unit as described herein.

In accordance with additional or alternative embodiments, the system further comprises a workstation in signal communication with the modular array controller and configured to exchange data with the modular signal processing unit.

In accordance with additional or alternative embodiments, the data includes a sequence of calibration events provided by the workstation and scan results based on the data are displayed in real-time.

In accordance with additional or alternative embodiments, the data includes one or both of sampled analog data and data derived from the sampled analog data, and wherein the sampled analog data provides information including at least one of range detected from each channel, amplitude detected from each channel, phase detected from each channel; amplitude and phase of beams formed with different positions, frequencies, waveform patterns, and combinations of the data channels.

According to another non-limiting embodiment, a method of calibrating a DREX antenna system comprises performing one or both of transmitting energy and receiving energy by a DREX antenna array that includes a plurality of DREX elements defining a phased array of radiating elements configured to transmit and receive energy, and performing, by an antenna probe, one or both of receiving the energy from the DREX antenna array and transmitting the energy to the DREX antenna. The method further comprises processing the energy by a modular signal processing unit that includes a plurality of individual signal processing programmable integrated circuits. The method further comprises exchanging data between a modular array controller and one or a combination of the probe controller, the DREX antenna array, and the modular signal processing unit. The modular array controller includes at least one modular array unit that comprises a programmable integrated circuit and multicore processor.

In accordance with additional or alternative embodiments, each of the signal processing programmable integrated circuits is a signal processing field programmable gate array (FPGA) that is programmed with parallel fast Fourier transform (FFT)-based match filters and one or more synchronous digital circuit models to facilitate scalable data flow corresponding to the DREX antenna array.

In accordance with additional or alternative embodiments, the method further comprises exchanging data between the DREX antenna array and the modular signal processing unit using a data path between the DREX antenna array and a given signal processing FPGA among the plurality of signal processing FPGAs, the data path including a plurality of individual data channels.

In accordance with additional or alternative embodiments, at least one modular array controller unit is independently programmed with control and processing functionalities based on calibration and measurement target goals provided to the DREX antenna calibration system.

In accordance with additional or alternative embodiments, the receiving of energy from the DREX antenna array and the transmitting of energy to the DREX antenna further comprises moving the antenna probe with respect to the DREX antenna array such that the antenna probe is placed in signal communication with a given DREX element among the plurality of DREX elements.

In accordance with additional or alternative embodiments, moving the antenna probe further comprises outputting, by a probe controller, one or more probe control signals that control a position of the antenna probe with respect to the DREX antenna array.

In accordance with additional or alternative embodiments, the method further comprises controlling, by the probe controller, the antenna probe to operate in one or both of a receiving mode to receive energy from a given DREX element and a transmitting mode to transmit energy to a given DREX element among the plurality of DREX elements according to a grid of probe positions.

In accordance with additional or alternative embodiments, the method further comprises exchanging data between a workstation and the modular array controller, the data including a sequence of calibration events provided by the workstation.

In accordance with additional or alternative embodiments, the method further comprises displaying scan results on a workstation based on the data in real-time.

In accordance with additional or alternative embodiments, the data includes one or both of sampled analog data and data derived from the sampled analog data, and wherein the sampled analog data provides information including at least one of range detected from each channel, amplitude detected from each channel, phase detected from each channel; amplitude and phase of beams formed with different positions, frequencies, waveform patterns, and combinations of the data channels.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As the amount of data provided by DREX antenna system increases, there is a greater need for a DREX antenna calibration system that can provide high throughput data processing to minimize time needed to perform near field range (NFR) calibration. Current DREX antenna systems, however, use large racks of servers that implement commercial off-the-shelf (COTS) CPUs and GPUs, which have an extremely large footprint, slow computing speeds, and consume excessive power. In addition, current DREX antenna calibration systems cannot be easily scaled for performance because instruction set machines have fixed data and instruction pipelines. The higher latency and low throughput of conventional DREX antenna calibration systems also prevent them from providing real-time feedback of calibration measurements necessary for the operator to graphically observe errors during the scan. Observing the errors while scanning, allows the operator to intervene instead of waiting for several hours until the scan process is completed, and data is post processed and graphed.

Various non-limiting embodiments described herein provide a scalable real-time streaming DREX antenna calibration system capable of performing real-time and streaming signal processing functions required for calibrating and testing DREX arrays at a reduced footprint and reduced power consumption. Rather than employing large server racks, the scalable real-time streaming DREX antenna calibration system described herein implements a modular signal processing unit and a modular array controller.

The modular signal processing unit includes a plurality of individual signal processing programmable integrated circuits. Although the programmable integrated circuits are described herein as field programmable gate arrays (FPGAs), other types of programmable integrated circuits can be implemented including, but not limited to, custom application-specific integrated circuits (ASICs) and complex programmable logic devices (CPLDs). Each of the signal processing FPGAs can be programmed with parallel fast Fourier transform (FFT)-based match filters and synchronous digital circuitry to facilitate a scalable data flow and computing system specific to the DREX antenna array. The array controller includes a plurality of FPGAs with embedded microprocessor. Based on the size and throughput requirements of the DREX based array, the individual controller FPGAs with microprocessor can be configured to control different portions of the array. The controller FPGAs are synchronized so that the portions of the array they control participate cooperatively to form a larger array.

Figure 1:
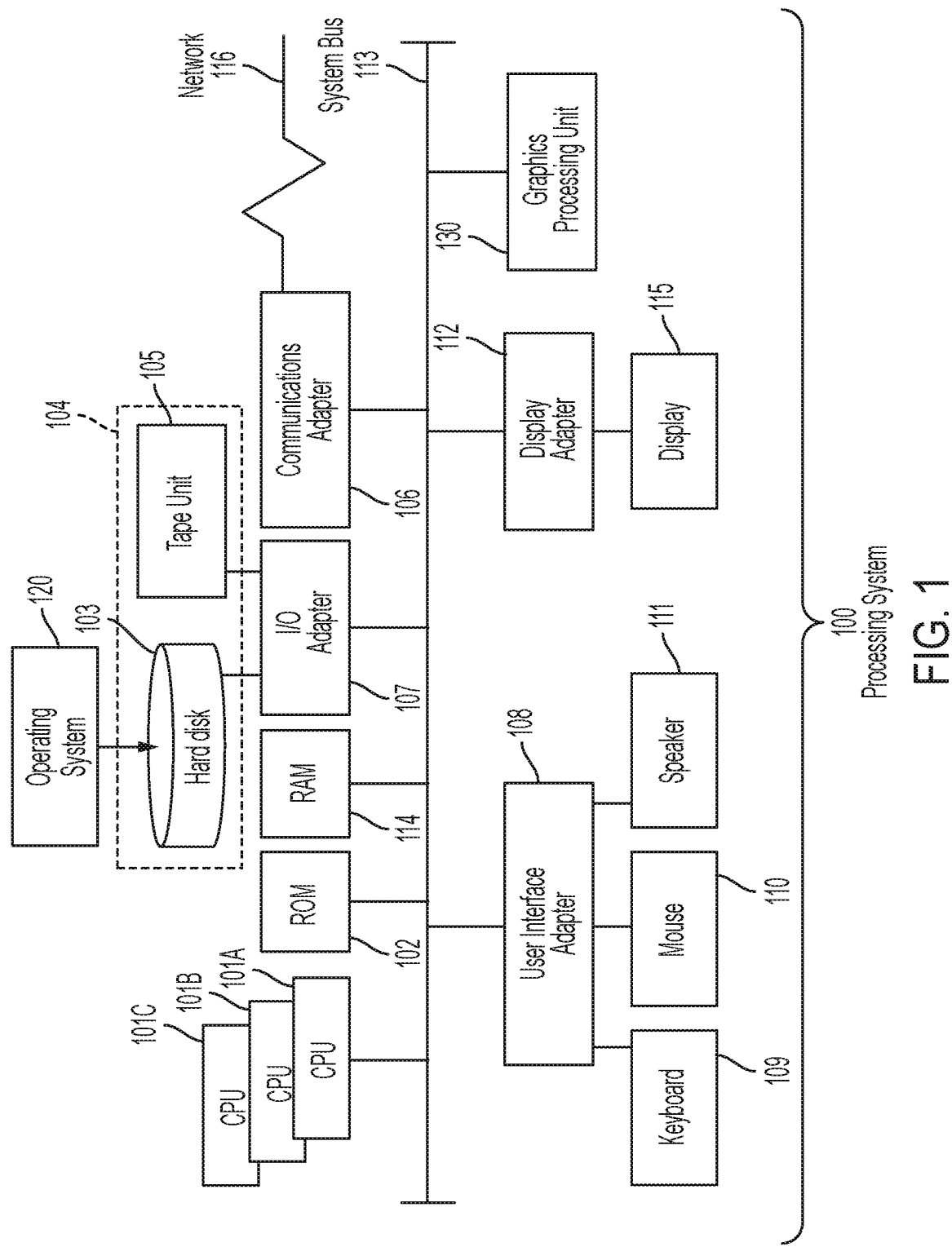
FIG. 1 is a block diagram of a processing system according to a non-limiting embodiment.

With reference now to FIG. 1, a processing system 100 for implementing the teachings described herein is illustrated according to a non-limiting embodiment. The processing system 100 has one or more central processing units (CPU), commonly referred to as "processors" 101a, 101b, 101c, etc. (collectively or generically referred to as processor(s) 101). In one or more embodiments, each processor 101 may include a Central Processing Units (CPU) or Graphics Processing Unit (GPU). Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor)

115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. The graphics processing unit 130 is a specialized electronic circuit designed to manipulate and alter memory to accelerate the creation of images in a frame buffer intended for output to a display. In general, the graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 103, input means such as keyboard 109 and mouse 110, and output capability including speaker 111 and display 115. In one embodiment, a portion of system memory 114 and mass storage 103 collectively store an operating system coordinate the functions of the various components shown in FIG. 1. System 100 is analogous to a CPU/GPU based processing system where processing of external data from a communications adaptor (106) requires transport, temporary storage and memory access for computation. Throughput enhancement from technologies like Direct Memory Access (DMA) or Remote DMA are still limited by the fixed internal memory bandwidths, processor pipelines and instruction program inefficiencies within an operating system (OS).

Figure 2:
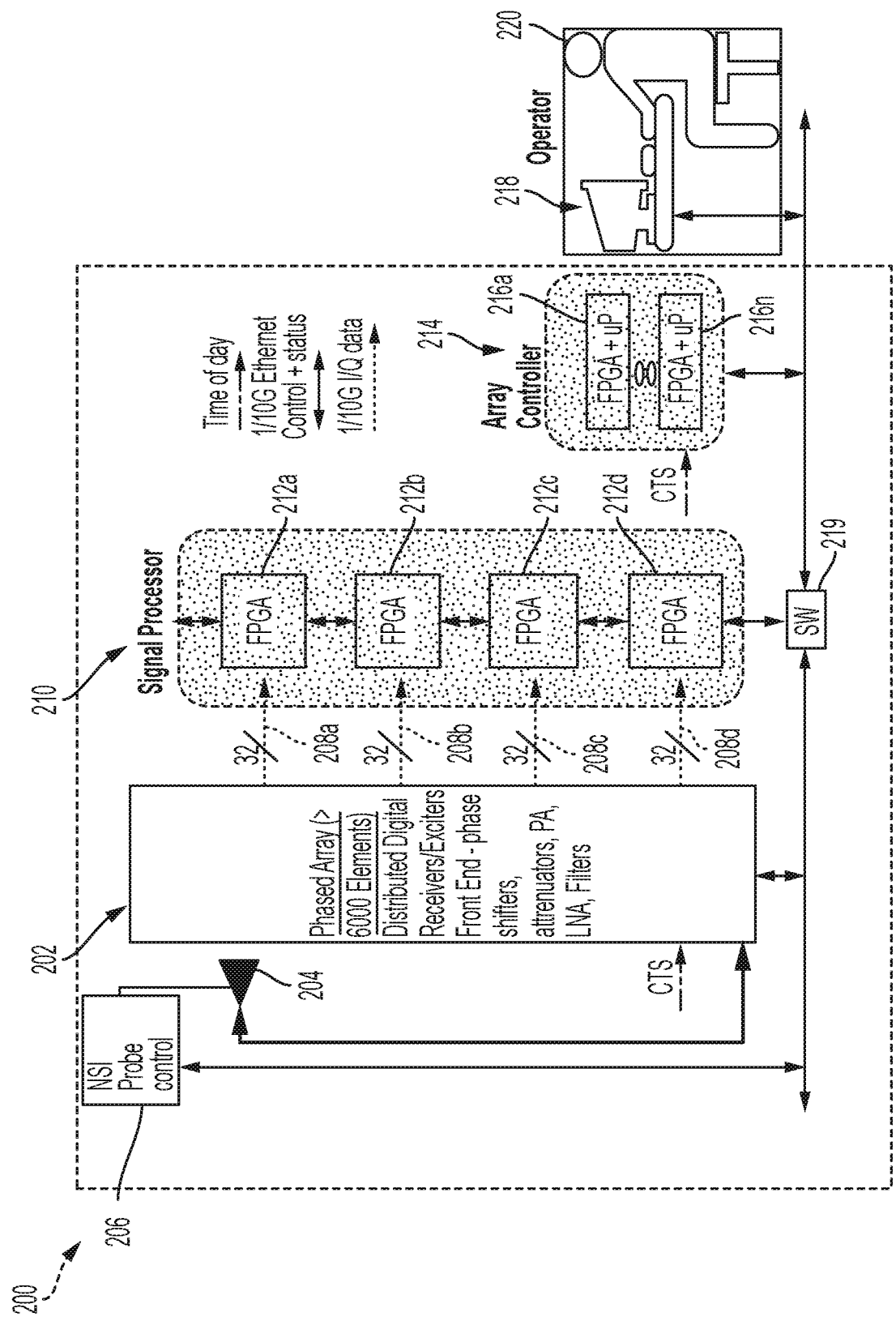
FIG. 2 is a diagram depicting a scalable real-time streaming DREX antenna calibration system.

Turning now to FIG. 2, a scalable real-time streaming DREX antenna calibration system 200 is illustrated according to a non-limiting embodiment of the present disclosure. The system 200 includes a DREX antenna array 202, an antenna probe 204, a probe controller 206, a modular signal processing unit 210, and an array controller 214.). The array controller 214 can also be located separately from the DREX antenna array 202 as illustrated in FIG. 2, or in other non-limiting embodiments can be integrated together with the DREX antenna array 202 in the front-end. In a similar manner, the modular signal processing unit 210 can be a separate unit within the front end (202) and delivered to the system as a built-in function without antenna array dependencies on back-end CPU/GPU based servers. The inclusion of the array controller 214 and the signal processing unit 210 with the antenna array encapsulates the antenna array functionality and allows decoupled innovation in antenna array subsystems.

The DREX antenna array 202 includes a plurality of DREXs with each DREX providing a receiver and transmitter for one or more elements of the antenna array. The DREX in conjunction with other circuitries in the antenna array defines a phased array of radiating elements configured to transmit and receive energy (e.g., radio frequency (RF) energy, also referred to as "radio waves"). In one or more non-limiting embodiments, the DREX antenna array 202 includes more than 6000 DREX elements. In one or more non-limiting embodiments, the DREX elements are combined to define a plurality of subarrays, and where each subarray has a separate DREX receive data path including or more channels that feeds into a digital beamformer (DBF). In one or more non-limiting embodiments, a subarray's receive signal vector can be measured and recorded per every radar pulse at a given frequency. Therefore, for any single pulse, the relative phase and amplitude of each subarray relative to the other subarrays can be measured.

The antenna probe 204 and the probe controller 206 operate together as a probe unit. The antenna probe 204 is arranged adjacent to the DREX antenna array 202 and is configured to move with respect to the DREX antenna array 202. Accordingly, the antenna probe 204 can be placed in signal communication with a given DREX element to detect one or more actions performed by the DREX antenna array 202. An action can include, but it not limited to, receive energy from a given DREX element and/or transmit energy to a given DREX element. The actions can be performed according to a scheduled timing that is synchronized between the probe controller 206, the DREX antenna array 202, the modular signal processing unit 210, and the array controller 214 based on one or more timing control signals. In one or more non-limiting embodiments, the DREX antenna array 202 is configured to perform one-thousand actions per second (1000/s). It should be appreciated, however, that the target action rate is not limited thereto.

The probe controller 206 is in signal communication with the antenna probe 204. The probe controller 206 is configured to output one or more probe control signals that control a position of the antenna probe 204 with respect to the DREX antenna array 202. The probe controller 206 is further configured to control the antenna probe 204 to operate in a receiving mode to receive energy from a given DREX element and/or a transmitting mode to transmit energy to the given DREX element. In one or more non-limiting embodiments, the antenna probe 204 is adjusted according to a grid of probe positions. The grid of probe positions can be preprogrammed in the probe controller 206 such that the movement of the antenna probe 204 to each grid point is governed by commands from the modular array controller 214 to the probe controller 206.

The modular signal processing unit 210 is in signal communication with the DREX antenna array 202 and is configured to process the energy received from the DREX antenna array 202. The modular signal processing unit 210 is configured to process each action performed by the DREX antenna array 202 at scheduled times according to a timer based on composite timing signal (CTS). The CTS provides timing pulses to maintain a timer that allows for synchronizing the DREX antenna array 202 and the modular array controller 214. The modular signal processing unit 210 includes a plurality of individual signal processing programmable integrated circuits 212a, 212b, 212c, 212d (212a-212d). As described herein, the modular signal processing unit 210 is described as implementing signal processing FPGAs 212a-212d; however, other types of programmable integrated circuits can be implemented including, but not limited to, custom application-specific integrated circuits (ASICs) and complex programmable logic devices (CPLDs). Although four FPGAs 212a-212d are shown, it should be appreciated that more or less FPGAs can be included in the modular signal processing unit 210 without departing from the scope of the present teachings.

The signal processing FPGAs 212a-212d are each in signal communication with the DREX antenna array 202 via a respective data path 208a-208d. A given data path 208a-208d can include a plurality of individual data channels. In one or more non-limiting embodiments, each data path 208a-208d can include thirty-two (32) data channels to exchange data flow with the DREX antenna array 202.

Each signal processing FPGA 212a-212d collects data from a respective data path 208a-208d and performs channel processing to perform calibration and alignment of the DREX antenna array 202. In one or more non-limiting embodiments, the channel processing includes, but is not limited to, pulse compression, stretch processing, and channel calibration. The pulse compression processing operation determines range, phase and amplitude of the channels included in a respective data path 208a-208d. The channel calibration operation determines alignment parameters of the DREX antenna array elements (e.g., the transmitters/receivers). Based on the alignment parameters generated by the modular signal processing unit 210, the modular array controller unit 214 can perform alignment of the analog components included in the front-end of the DREX antenna array 202 as well as digital alignment of the individual DREX channels Each of the signal processing FPGAs 212a-212d are also programmed with a parallel fast Fourier transform (FFT)-based match filter and one or more synchronous digital circuit models corresponding to the architecture of the DREX antenna calibration system 200. Accordingly, the FPGAs 212a-212d can facilitate scalable data flow corresponding to the specific data path/channels 208-208d of the DREX antenna array 202.

In one or more non-limiting embodiments, each of the signal processing FPGAs 212a-212d can exchange data among one another. In this manner, the modular signal processing unit 210 can perform error detection to determine if one or more of the channels included in a given data path 208a-208d contains a fault or error.

The modular array controller 214 is in signal communication with the probe controller 206, the DREX antenna array 202, and the modular signal processing unit 210. The modular array controller 214 includes one or more individual array programmable integrated circuits 216a-216n. As described herein, the modular array controller 214 is described as implementing array FPGAs 216a-216n; however, other types of programmable integrated circuits can be implemented including, but not limited to, custom application-specific integrated circuits (ASICs) and complex programmable logic devices (CPLDs). The array controller FPGAs 216a-216n are independently programmed with control and processing functionalities. The control and processing functionalities can be based on calibration and measurement target goals to be performed by the DREX antenna calibration system 200. In one or more non-limiting embodiments, the modular array controller 214 is configured to determine beam steering vectors of each element (e.g., phase, amplitude) and perform verification by evaluating phased array patterns provided by the DREX antenna array 202.

In one or more non-limiting embodiments, a workstation 218 is provided and is in signal communication with the probe controller 206, the DREX antenna array 202, the modular signal processing unit 210, and the modular array controller 214. A switch 219 can be provided to selectively route data between the probe controller 206, the DREX antenna array 202, the modular signal processing unit 210, the modular array controller 214, and the workstation 218.

The workstation 218 can be operated by a user 220 to exchange data with the system 200. The data includes, but not limited to, array element calibration and measurement target goals, the pattern constants, beam scheduling data, measurement timeline management data, power management data, probe operating mode commands, unprocessed DREX data, and real-time sensed or measured data processed by the modular signal processor 210. The increased operating speeds provided by the modular signal processing unit 210 and the modular array controller 214 allow the workstation 218 to display measured scan results in real-time.

In one or more non-limiting embodiments, the data collected by the workstation 218 includes results from calibration events commanded by the workstation operator 220 and the scan results displayed in real-time are also selected by the operator 220. The data collected includes, for example, sampled analog data and/or data derived from the sampled analog data. The sampled analog data provides various information including, but not limited to, range, amplitude and phase detected from each channel; amplitude and phase of beams formed with different positions, frequencies, waveform patterns, and combinations of DREX channels.

The corresponding structures, materials, acts, and equivalents of all means or step-plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A digital receiver/exciter (DREX) antenna calibration system, comprising:
   a DREX antenna array including a plurality of DREX elements defining a phased array of radiating elements configured to transmit and receive energy;
   an antenna probe arranged adjacent to the DREX antenna array and configured to receive energy from the DREX antenna array and/or transmit energy to the DREX antenna array;
   a modular signal processing unit in signal communication with the DREX antenna array, the modular signal processing unit including a plurality of individual signal processing programmable integrated circuits configured to process sampled data from the received energy; and
   a modular array controller in signal communication with the probe controller, the DREX antenna array, and the modular signal processing unit, the modular array controller including at least one modular array unit that comprises an array programmable integrated circuit and a multicore processor.

2. The DREX antenna calibration system according to claim 1, wherein each of the signal processing programmable integrated circuits is a signal processing field programmable gate array (FPGA) that is programmed with parallel fast Fourier transform (FFT)-based match filters and one or more synchronous digital circuit models to facilitate scalable data flow corresponding to the DREX antenna array.

3. The DREX antenna calibration system according to claim 2, wherein each of the signal processing FPGAs is in signal communication with the DREX antenna array via a data path that includes a plurality of individual data channels.

4. The DREX antenna calibration system according to claim 3, wherein the at least one modular array unit is independently programmed with control and processing functionalities based on calibration and measurement target goals provided to the DREX antenna calibration system.

5. The DREX antenna calibration system according to claim 4, wherein the antenna probe is configured to move with respect to the DREX antenna array so as to be placed in signal communication with a given DREX element.

6. The DREX antenna calibration system according to claim 5, further comprising a probe controller in signal communication with the antenna probe, the probe controller configured to output one or more probe control signals that control a position of the antenna probe with respect to the DREX antenna array.

7. The DREX antenna calibration system according to claim 6, wherein the probe controller controls the antenna probe to operate in one or both of a receiving mode to receive energy from a given DREX element and a transmitting mode to transmit energy to a given DREX element among the plurality of DREX elements according to a grid of probe positions.

8. The DREX antenna calibration system according to claim 7, further comprising a workstation in signal communication with the modular array controller and configured to exchange data with the modular signal processing unit.

9. The DREX antenna calibration system according to claim 8, wherein the data includes a sequence of calibration events provided by the workstation and scan results based on the data are displayed in real-time.

10. The DREX antenna calibration system according to claim 9, wherein the data includes one or both of sampled analog data and data derived from the sampled analog data, and wherein the sampled analog data provides information including at least one of range detected from each channel, amplitude detected from each channel, phase detected from each channel; amplitude and phase of beams formed with different positions, frequencies, waveform patterns, and combinations of the data channels.

11. A method of calibrating a digital receiver/exciter (DREX) antenna, the method comprising:
performing one or both of transmitting energy and receiving energy by a DREX antenna array that includes a plurality of DREX elements defining a phased array of radiating elements configured to transmit and receive energy;
performing, by an antenna probe, one or both of receiving the energy from the DREX antenna array and transmitting the energy to the DREX antenna;
processing sampled data from the received energy by a modular signal processing unit that includes a plurality of individual signal processing programmable integrated circuits; and
exchanging data between a modular array controller and one or a combination of the probe controller, the DREX antenna array, and the modular signal processing unit, the modular array controller including at least one modular array unit that comprises an array programmable integrated circuit and a multicore processor.

12. The method of claim 11, wherein each of the signal processing programmable integrated circuits is a field programmable gate array (FPGA) that is programmed with parallel fast Fourier transform (FFT)-based match filters and one or more synchronous digital circuit models to facilitate scalable data flow corresponding to the DREX antenna array.

13. The method of claim 12, further comprising exchanging data between the DREX antenna array and the modular signal processing unit using a data path between the DREX antenna array and a given signal processing FPGA among the plurality of signal processing FPGAs, the data path including a plurality of individual data channels.

14. The method of to claim 13, wherein the at least one modular array controller unit is independently programmed with control and processing functionalities based on calibration and measurement target goals provided to the DREX antenna calibration system.

15. The method of claim 14, wherein the receiving of energy from the DREX antenna array and the transmitting of energy to the DREX antenna further comprises moving the antenna probe with respect to the DREX antenna array such that the antenna probe is placed in signal communication with a given DREX element among the plurality of DREX elements.

16. The method of claim 15, wherein moving the antenna probe further comprises outputting, by a probe controller, one or more probe control signals that control a position of the antenna probe with respect to the DREX antenna array.

17. The method of claim 16, further comprising controlling, by the probe controller, the antenna probe to operate in one or both of a receiving mode to receive energy from a given DREX element and a transmitting mode to transmit energy to a given DREX element among the plurality of DREX elements according to a grid of probe positions.

18. The method of claim 17, further comprising exchanging data between a workstation and the modular array controller, the data including a sequence of calibration events provided by the workstation.

19. The method of claim 18, further comprising displaying scan results based on the data in real-time.

20. The method of claim 19, wherein the data includes one or both of sampled analog data and data derived from the sampled analog data, and wherein the sampled analog data provides information including at least one of range detected from each channel, amplitude detected from each channel, phase detected from each channel; amplitude and phase of beams formed with different positions, frequencies, waveform patterns, and combinations of the data channels.

* * * * *